UNITED STATES PATENT OFFICE.

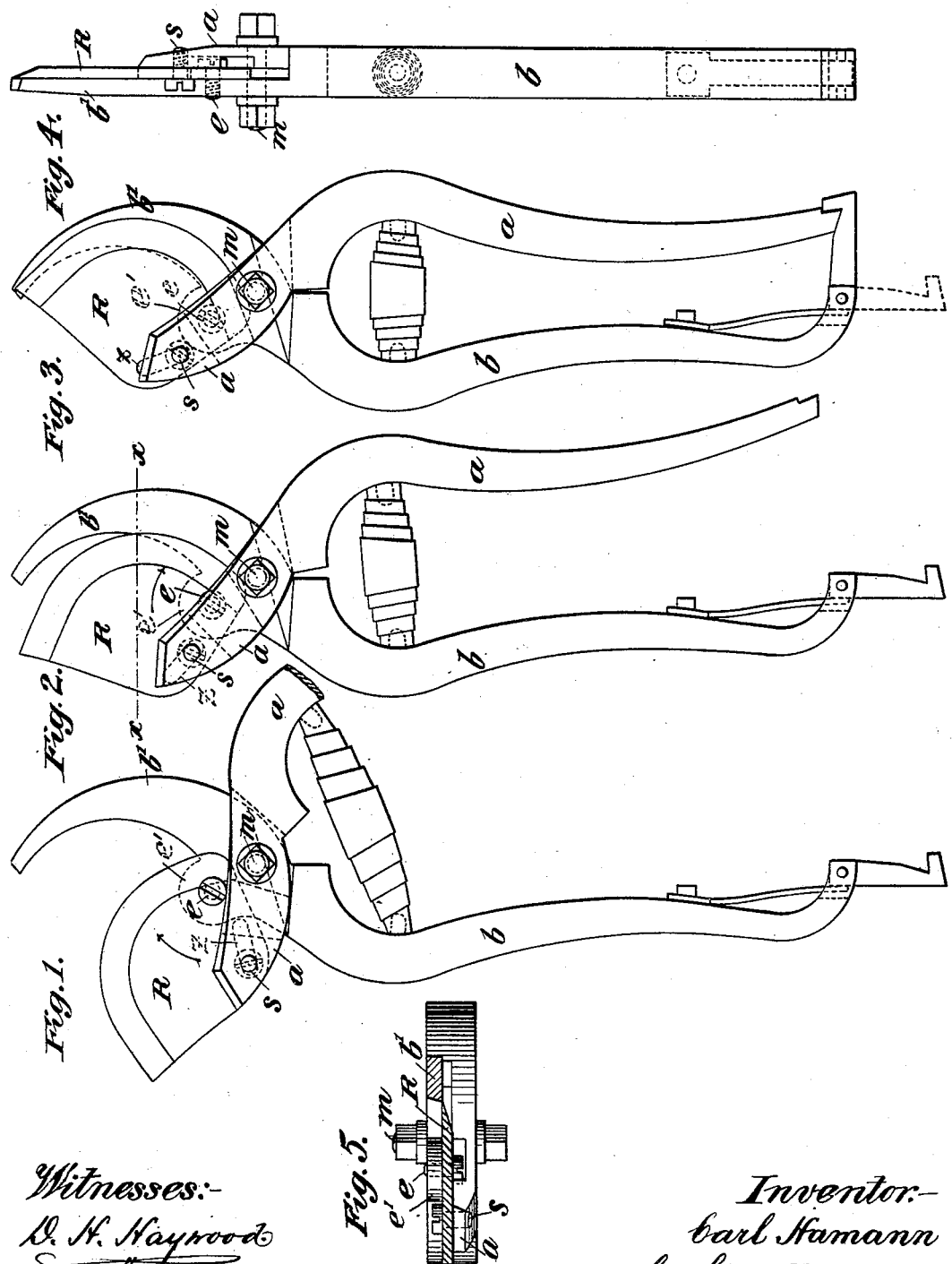

CARL HAMANN, OF REINBECK, PRUSSIA.

PRUNING IMPLEMENT.

SPECIFICATION forming part of Letters Patent No. 434,595, dated August 19, 1890.

Application filed March 19, 1890. Serial No. 344,465. (No model.) Patented in Germany April 9, 1889, No. 51,580; in England April 10, 1889, No. 6,163; in Belgium May 8, 1889, No. 86,157, and in France May 9, 1889, No. 198,093.

*To all whom it may concern:*

Be it known that I, CARL HAMANN, of Reinbeck, in the Kingdom of Prussia, Empire of Germany, have invented a new and useful Improvement in Shears, (for which I have obtained patents in Great Britain, No. 6,163, dated April 10, 1889; in Belgium, No. 86,157, dated May 8, 1889; in France, No. 198,093, dated May 9, 1889, and in Germany, No. 51,580, dated April 9, 1889,) of which the following is a specification, reference being had to the accompanying drawings.

The main object of this invention is to so pivot the blades of shears that they may cut with shearing or sliding cut.

To this end the invention consists in the combinations of parts, hereinafter described and claimed.

The accompanying drawings represent a pair of garden or pruning shears constructed according to this invention.

Figure 1 is a side view of the improved shears open; Fig. 2, a similar view of the same partially closed; Fig. 3, a similar view of the same fully closed; Fig. 4, an edge view thereof, and Fig. 5 a section on line $x$ of Fig. 2.

Similar letters of reference designate corresponding parts in all the figures.

$a\ b$ are the two parts of the shears which constitute the levers or handles and are pivoted together at $m$. One of these parts $b$ extends beyond the pivotal point to form one of the blades $b'$. The other part $a$ extends to a certain distance to engage with the other blade $R$, which is pivoted, not at the point $m$, but at the point $e$, to a lug $e'$ on the inner side of the fixed blade $b'$, and the part $a$ is connected to the blade $R$ by a pin $s$ thereon engaging in a slot $z$, the pivotal point $e$ being so placed with regard to the pin $s$ and pivotal point $m$ that the action of the part $a$ in opening and closing the shears causes the blade $R$ to open and close, substantially as represented in the drawings. By this method I combine the straight action of the handles of ordinary shears with a shearing or sliding cut of the blades, and also cause the opening of the blades to be greater for a certain opening of the handles than would be the case with a blade $R$ fixed to the part $a$, as can readily be seen from Fig. 1.

To give a good shearing-cut, I prefer to curve the edge of the blade $R$ in a parabolic or similar salient curve, as shown. The fixed blade $b'$ of the part $b$ may be straight or preferably curved also, as shown, with a hollow curvature.

The direction of the cut should be in the direction of the arrow, Figs. 1 and 2, so that the object to be cut may not be forced out from between the blades during the cutting.

What I claim as my invention is—

The herein-described shears, consisting of the two handles or levers $a\ b$, pivotally secured together, one of the said handles or levers $b$ being projected beyond its pivotal point to form a fixed blade and provided with a lug $e$ in proximity to the inner end of its cutting-edge, the other of the two handles or levers $a$ being projected beyond its pivotal point, the loose swinging blade $R$, pivotally secured to the lug $e$ in proximity to the inner end of its cutting-edge and located between the projecting ends of the levers, the said blade $R$ having a slot-and-pin connection with the projected end of the lever $a$ at a point outside of the pivotal connection $e$, substantially as set forth.

CARL HAMANN.

Witnesses:
F. ENGEL,
H. WITT.